Patented June 7, 1938

2,120,222

UNITED STATES PATENT OFFICE 2,120,222

NONINFLAMMABLE PLASTIC MASS

Wilfrid Devonshire Spencer, Liverpool, and Frederic Thomas Walker, London, England, assignors to Imperial Chemical Industries Limited, a corporation of Great Britain No Drawing. Application August 30, 1935, Serial No. 38,648. In Great Britain September 3, 1934

11 Claims. (Cl. 106—23)

This invention relates to non-inflammable plastic masses which are particularly suitable for use as, or in the production of, floor coverings and moulding powders.

It is known that plastic masses can be made by incorporating, in the presence of a volatile solvent medium, chlorinated rubber with, for example, tricresyl phosphate. In British Patent No. 424,335 there is claimed a process for the production of plastic masses suitable for use in the manufacture of floor coverings, which process includes the step of incorporating, in the absence of added volatile solvents, substantially solvent-free chlorinated rubber with a plasticizer therefor and, optionally, a softener, the proportion of plasticizer exceeding 55% and the total proportion of plasticizer and any softener not exceeding 200% calculated on the weight of the chlorinated rubber.

According to the present invention non-inflammable plastic masses particularly suitable for use as, or in the production of, floor coverings or moulding powders, are compounded from chlorinated rubber and chlorinated paraffin wax, the latter fulfilling the function of non-inflammable plasticizer. Pigments, fillers and the like may also be added as well as known plasticizers, preferably in such amounts that the non-inflammability of the product is not substantially affected. As other plasticizers there may be used for example, tricresyl phosphate, dibutyl phthalate or chlorinated diphenyl. Preferably we use a chlorinated rubber containing about 65% of chlorine and stabilized by treatment with a basic substance or otherwise, and a suitable chlorinated paraffin wax is one containing about 40% to 50% chlorine.

Many methods may be used for compounding the plastic masses. For instance, the chlorinated rubber and the chlorinated paraffin wax may be dissolved in a suitable volatile solvent which is subsequently removed by evaporation. Thus, for example, the chlorinated paraffin wax may be dissolved in a carbon tetrachloride solution of chlorinated rubber, followed by the injection of the solution under the surface of a volume of agitated boiling water, as described in U. S. Patent No. 1,996,937. It is preferred, however, to compound the plastic masses by mixing the constituents in the absence of added volatile solvents until a homogeneous mass is obtained, the mixing of the constituents suitably being effected at a raised temperature.

The physical properties of the masses and, therefore, the use to which they may be put, are of course, dependent on the proportion of the various constituents, particularly on the relative amounts of chlorinated rubber and chlorinated paraffin wax. Thus masses in which the ratio of chlorinated rubber to chlorinated paraffin wax is high are plastic only at elevated temperatures while those in which the chlorinated paraffin wax predominates can be worked at room temperatures.

Thus in mixtures required only for hot moulding, the proportion of chlorinated rubber to chlorinated paraffin wax should not be less than 1:1. Preferably, moulding powders are made from mixtures containing chlorinated rubber and chlorinated paraffin wax in the ratio of approximately 3:1 to 10:1, together with fillers, e. g. woodmeal, china clay or cork dust, and pigments, e. g. yellow ochre, up to an amount approximately equal in weight to the chlorinated rubber. Such powders can be prepared by first thoroughly mixing chlorinated rubber and chlorinated paraffin wax in the proportion of about 2:3 in a steam-heated mixer, and then incorporating a further amount of chlorinated rubber on steam-heated rollers, the fillers and pigments being subsequently worked into the homogeneous mass in a similar manner. The final composition is then cooled, and ground. Such moulding powders may be converted in the usual way to highly polished translucent or opaque articles of good finish and pleasing appearance.

In order to prepare plastic masses suitable for use as floor coverings, the ratio of chlorinated rubber to chlorinated paraffin wax should preferably be approximately 2:3, and in general proportions lying between 1:1 and 1:3 are suitable. The proportions of chlorinated rubber to plasticizer may however be the same as claimed in British Patent No. 424,335. In preparing the masses, any suitably heated mixer may be used, the chlorinated rubber and chlorinated paraffin wax merely being worked together, say at 100° C. until a homogeneous mass is obtained. Fibrous or like organic fillers such as powdered cork, woodmeal and the like, with or without other fillers or pigments, e. g. chalk, kieselguhr or iron oxide, are then incorporated. The mass may become so viscous that milling by steam-heated rollers may be necessary to ensure homogeneity. To utilize the product as a floor covering, it may be merely rolled out into sheets of the required thickness and cut to the desired size, or the sheets may be pressed on to a canvas or cloth backing. A suitable method of preparing the plastic compositions or the floor covering materials is that described in the aforementioned British Patent No. 424,335. When a softener is included as therein-indicated, e. g. gelled castor oil, it will be understood that the relative proportions of chlorinated rubber and chlorinated paraffin wax may need to be modified.

The following examples describe methods of preparing plastic masses according to the invention, and subsequently working them up into useful products, the first two being typical of the preparation of plastic masses for floor coverings, while the others describe the productions of moulding powders. All parts are by weight.

*Example 1*

26 parts of chlorinated paraffin wax containing 42% of chlorine were placed in a steam-heated mixer and 17 parts of chlorinated rubber slowly added during constant mixing. When a completely uniform mass had been obtained, 40 parts of powdered cork and 17 parts of iron oxide pigment were gradually incorporated. The first portions of the cork and pigment were added to the mass in the steam-heated mixer but it became necessary to transfer the mixture to steam-heated rollers to complete the operation. When a uniform product had been obtained the material was rolled out into a sheet $\frac{3}{16}$" thick and a jute backing pressed on to the sheet before it had cooled. As a further precaution to ensure non-inflammability, cloth previously impregnated with chlorinated rubber from a carbon tetrachloride solution may be used. Alternatively the heated mass, instead of being pressed on to a cloth backing, may be applied directly to the surface to be covered, and pressed into position to give a layer of the desired thickness.

*Example 2*

In this example the following proportions of the various constituents were used:—

| | Parts |
|---|---|
| Chlorinated rubber | 15 |
| Chlorinated paraffin wax | 21 |
| Chalk | 11 |
| Cork dust | 38 |
| Iron oxide pigment | 15 |

The chlorinated paraffin wax and chlorinated rubber were mixed as in Example 1 in a steam-heated mixer maintained at about 90° C., a small amount of the chalk being added simultaneously with the chlorinated rubber. When a uniform mass had been obtained a portion of the cork was added in sufficient quantity to destroy any tackiness in the mass, which was then transferred to steam-heated rollers and the remainder of the fillers and pigment was incorporated. The remainder of the operation was carried out as in Example 1.

*Example 3*

25 parts of a mixture containing chlorinated rubber and chlorinated paraffin wax in the ratio of 2:3 were mixed on steam-heated rollers with 44.5 parts of chlorinated rubber, 25 parts of woodmeal and 5.5 parts of yellow ochre, and the incorporation continued to form a homogeneous product. The resultant mass was cooled and ground to a fine powder, and was suitable for use as moulding powder.

*Example 4*

15 parts of a mixture containing chlorinated rubber and chlorinated paraffin wax in the ratio of 2:3 were mixed on steam-heated rollers with 28 parts of chlorinated rubber, 51 parts of woodmeal, 2 parts of yellow ochre and 3 parts of tricresylphosphate, and the incorporation continued to form a homogeneous product. The mass was then cooled and ground, and was suitable for use as a moulding powder.

We claim:—

1. A method of preparing plastic compositions which includes the steps of incorporating chlorinated rubber with an excess of chlorinated paraffin wax at an elevated temperature and then incorporating a further quantity of chlorinated rubber at an elevated temperature.

2. A method of preparing plastic compositions which includes the steps of thoroughly mixing chlorinated rubber and chlorinated paraffin wax in the proportion of about 2:3 by weight at an elevated temperature, incorporating a further amount of chlorinated rubber at an elevated temperature, and then incorporating a filler also at an elevated temperature.

3. A method as set out in claim 2 including the further steps of cooling the final mixture, and then grinding it to a fine powder.

4. A method of preparing plastic masses which includes the step of incorporating substantially solvent free chlorinated rubber with chlorinated paraffin wax, the incorporation being conducted at an elevated temperature and in the absence of added volatile solvents.

5. A non-inflammable floor covering material comprising a plastic composition consisting of chlorinated rubber and, as plasticizer therefor, a chlorinated paraffin wax together with a filler and pigment in substantially the following proportions: 17 parts of chlorinated rubber, 26 parts of chlorinated paraffin wax, 40 parts of powdered cork and 17 parts of iron oxide.

6. A non-inflammable plastic composition suitable for use in the production of moulding powders containing the following ingredients in substantially the following proportions: 25 parts of a mixture containing chlorinated rubber and chlorinated paraffin wax in a ratio of 2:3, 44.5 parts of chlorinated rubber, 25 parts of woodmeal and 5.5 parts of yellow ochre.

7. A non-inflammable floor covering material comprising a plastic composition consisting substantially of 15 to 17 parts chlorinated rubber and, as plasticizer therefor, 21 to 26 parts of chlorinated paraffin wax, the remainder consisting of filler and pigment materials.

8. A material as set out in claim 7 including a second plasticizer.

9. A non-inflammable plastic composition suitable for use in the production of moulding powders consisting substantially of 15 to 25 parts of a mixture containing chlorinated rubber and chlorinated paraffin wax in a ratio of 2:3 and 28 to 44.5 parts chlorinated rubber, the remainder consisting of filler and pigment materials.

10. A composition as set out in claim 9 including an additional plasticizer.

11. A composition which is thermoplastic and substantially non-inflammable and suited for use in linoleum-like floor coverings and hot moulding powders, said composition, except for filler and pigment materials, consisting substantially of chlorinated rubber and chlorinated paraffin wax in proportions resulting in affording a thermoplastic composition instead of merely a viscous mass, the ratio of chlorinated rubber to chlorinated paraffin wax ranging from a low ratio of somewhat less than 1 to 1 to a ratio of as high as 10 to 1.

WILFRID DEVONSHIRE SPENCER.
FREDERIC THOMAS WALKER.